Figure 1:
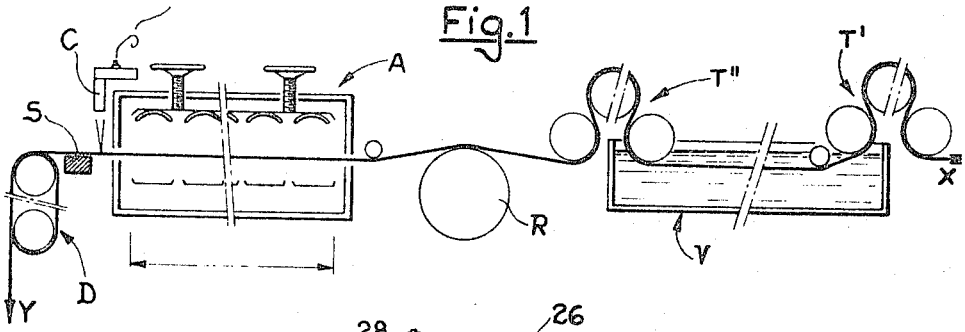
Figure 2:
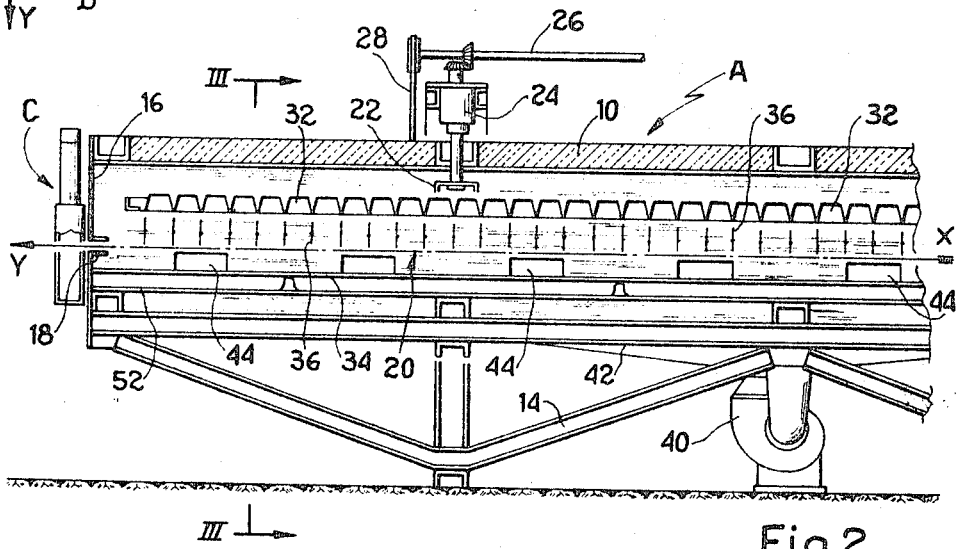
Figure 3:
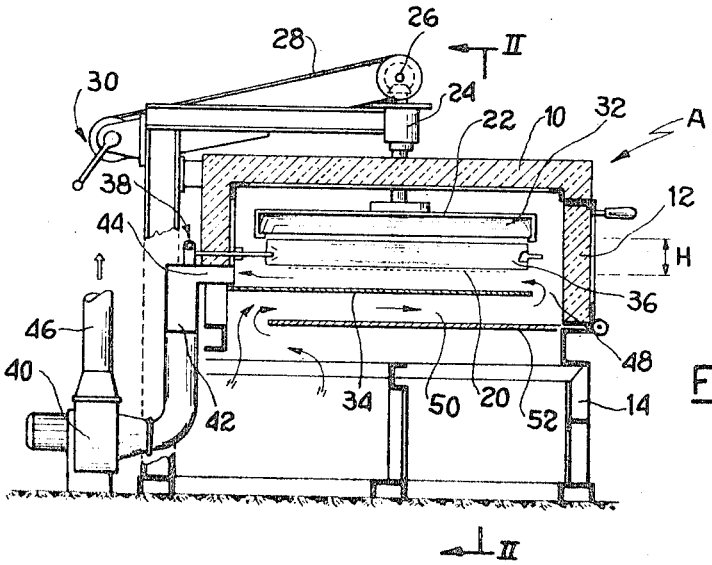

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 17, 1973

909 O.G. 795

T909,018

METHOD AND EQUIPMENT FOR HEAT-SETTING TREATMENT OF SYNTHETIC FILAMENTS BY MEANS OF INFRARED RAYS

Francesco Siclari, Bruno D'Alo, and Giulio Del Ninno, Milan, Italy, assignors to SNIA Viscosa Societá Nazionale Industria Applicazion Viscosa, Milan, Italy

Filed May 15, 1972, Ser. No. 253,115
Int. Cl. B29c *25/00*
U.S. Cl. 264—346
1 Sheet Drawing. 21 Pages Specification

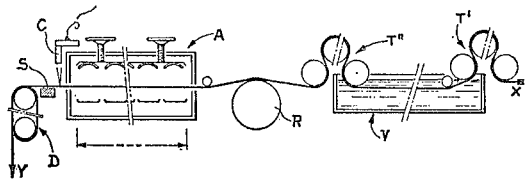

A method and apparatus for the heat-setting treatment of synthetic filaments are provided. The filaments are arranged in a parallel manner and are advanced under a predetermined tension through a processing chamber wherein the filaments are subjected to infrared rays. The filaments also may be subjected to a contact heating operation upstream and/or downstream of the infra red ray processing chamber.

Within the chamber and above the filaments are positioned radiators for generating the infrared rays. Below the filaments are positioned reflecting surfaces. The infrared ray radiators are adjustably positioned with respect to the filaments. Radiation intercepting means, preferably in the form of movable louvers, are positioned between the filaments and the radiators. The louvers are movable from a position perpendicular to the filaments to allow maximum infrared ray access thereto, to a position parallel to said filaments to substantially block access of infrared rays thereto. The chamber is provided with a device to create continuous circulation of air therethrough. Advantageously, the direction of air flow within the chamber is perpendicular to the direction of movement of the filaments.

METHOD AND EQUIPMENT FOR HEAT-SETTING TREATMENT OF SYNTHETIC FILAMENTS BY MEANS OF INFRARED RAYS

Filed May 15, 1972